Reissued Mar. 1, 1938 Re. 20,666

UNITED STATES PATENT OFFICE 20,666

METHOD FOR THE CONCENTRATION OF ORES

George H. Wigton, Eureka, Utah

No Drawing. Original No. 1,783,206, dated December 2, 1930, Serial No. 287,349, June 21, 1928. Application for reissue October 6, 1931, Serial No. 567,289

14 Claims. (Cl. 209—166)

This invention relates to the concentration of ores by flotation and is particularly applicable to the treatment of those ores in which the valuable minerals occur entirely or in a partially oxidized state. Heretofore, most of the efforts to float oxidized ores have included a preliminary step designed to place a sulfid film on the particles of oxidized minerals, followed by a similar flotation operation to that practiced on sulfid ores. Sulfidizing operations are objectionable on many ores, because they tend to reduce silver extraction if enough sulfidizing agent is added to insure high recovery of the base metals and a clean concentrate. Also, the consumption of the sulfidizing agent on ores containing very much hydrated iron oxide is very high. Efforts to float the oxidizing minerals without sulfidizing, by using a reagent with a strong collecting action, like oleic acid, result in flotation so non-selective that good extraction and high grade concentrate are impossible to produce simultaneously.

The present invention is based on the discovery that a class of compounds formed by the reaction of amino compounds with phosphorus pentasulfid or with phosphorus pentasulfid and an alcohol are effective flotation agents, not only for the sulfid minerals, but also for the oxidized minerals of gold, silver, lead and copper. Phosphorus enters into and forms a part of such reaction products. While all the reconstructed amino compounds tried have shown the ability to float oxidized minerals, I have found the reaction products of phosphorus pentasulfid or phosphorus pentasulfid and an alcohol with aniline, orthotoluidine and alpha naphthylamine respectively to give most satisfactory results.

The reaction products of amino compounds with phosphorus pentasulfid are solids. In flotation operations it is advantageous to have the reagents in a liquid condition in order that they may easily and accurately be added to the flotation pulp. Consequently it becomes desirable to dissolve these solid reaction products in an organic solvent. In some cases it may be preferable to dissolve the amino compound in the solvent before reacting it with phosphorus pentasulfid. It is also possible to obtain a liquid product by reacting a large excess of a liquid amino compound with phosphorus pentasulfid.

The reaction products of phosphorus pentasulfid and amino compounds are described and specifically claimed in my co-pending application Serial No. 375,892, filed July 3, 1929.

The reaction products of amino compounds, phosphorus pentasulfid and an alcohol are sufficiently fluid for use as formed.

Any of the alcohols may be used. I have found amyl and butyl to give particularly satisfactory results.

Any amino compound may be used. I have found aniline, ortho toluidine and alpha naphthylamine to give a satisfactory product.

A mixture of phosphorus and sulfur may be used instead of phosphorus pentasulfid.

The reaction product of alpha naphthylamine, phosphorus pentasulfid and butyl alcohol gives particularly good results on the ore with which I have been working. It has desirable frothing properties, as well as marked collecting power for oxidized minerals.

Following is a description of one method used in making a satisfactory compound for the purpose of floating oxidized minerals: 17.4 lb. of normal butyl alcohol, and 21.75 lb. alpha naphthylamine were placed in a 10-gallon ice-cream freezer and the mixture agitated until solution was complete. Then 10.85 lb. phosphorus pentasulfid was gradually added, while cold water was allowed to circulate around the revolving inside cylinder. Agitation was continued for three hours after the last of the phosphorus pentasulfid was added, care being taken to keep the mixture cold at all times. The resulting product was a semi-transparent, brown, viscous liquid, and had a marked ability to float oxidized minerals, as well as sulfid minerals.

To illustrate the action of this compound, results are given of a test on a mixture of oxidized ores from the Tintic district, Utah. The ore was ground so that it all passed a sixty-five mesh screen; 0.4 lb. per ton of ore of the compound was added along with 0.5 lb. sodium silicate (water glass) per ton of ore, and a heavy froth removed. This froth contained practically all the sulfid mineral and much of the oxidized mineral. After this froth had overflowed, an additional 0.2 lb. of the compound and 0.25 lb. sodium silicate per ton of ore was added, and a second froth removed. It is desirable to add the reagent in more than one stage, as any sulfid mineral seems to prevent the complete flotation of the oxidized mineral with only one addition of reagent. Following are the results obtained:

| | Percent by wt. | Gold | Silver | Percent Pb | Percent Fe | Percent Insol. | Percent recoveries | | |
|---|---|---|---|---|---|---|---|---|---|
| | | | | | | | Au | Ag | Pb |
| | | *Oz./ton* | *Oz./ton* | | | | | | |
| Ore | 100.0 | .099 | 17.02 | 20.70 | 4.6 | 55.7 | 100 | 100 | 100 |
| Conct | 44.6 | .18 | 34.3 | 43.7 | 2.8 | 18.2 | 80.8 | 89.9 | 94.1 |
| Tail | 55.4 | .035 | 3.1 | 2.2 | 5.9 | ------ | 19.2 | 10.1 | 5.9 |

Per cent sulfur in heads 1.31.

It will be understood that the foregoing is only a single example of procedure, and I do not wish the invention to be limited to this specific agent or method.

I claim:

1. The process of concentrating oxidized ores by froth flotation which comprises subjecting the ore in the form of a pulp to a flotation operation in the presence of the reaction product of an alcoholic solution of alpha naphthylamine and phosphorus pentasulfid.

2. The process of concentrating oxidized ores by froth flotation which comprises subjecting the ore in the form of a pulp to a flotation operation in the presence of the reaction product of an alcoholic solution of an amino compound and phosphorus pentasulfid.

3. An agent for use in flotation comprising the reaction product of an alcoholic solution of alpha naphthylamine and phosphorus pentasulfid.

4. The process of concentrating oxidized ores by froth flotation which comprises subjecting the ore in the form of a pulp to a flotation operation in the presence of the reaction product of an alcohol, an amino compound and phosphorus pentasulfid.

5. The process of concentrating oxidized ores by froth flotation which comprises subjecting the ore in the form of a pulp to a flotation operation in the presence of the reaction product of an alcohol, an aromatic amino compound and phosphorus pentasulfid.

6. The process of concentrating oxidized ores by froth flotation which comprises subjecting the ore in the form of a pulp to a flotation operation in the presence of the reaction product of an alcohol, alpha naphthylamine and phosphorus pentasulfid.

7. The process of concentrating oxidized ores by froth flotation which comprises subjecting the ore in the form of a pulp to a flotation operation in the presence of a soluble silicate and the reaction product of an alcoholic solution of alpha naphthylamine and phosphorus pentasulfid.

8. The process of concentrating oxidized ores by froth flotation which comprises subjecting the ore in the form of a pulp to a flotation operation in the presence of the reaction product of an alcoholic solution of an amino compound and phosphorus pentasulfid, and sodium silicate.

9. The process of concentrating oxidized ores by froth flotation which comprises subjecting the ore in the form of a pulp to a flotation operation in the presence of a soluble silicate and the reaction product of an alcohol, an amino compound and phosphorus pentasulfid.

10. The process of concentrating ores by froth flotation which comprises subjecting the ore in the form of a pulp to a flotation operation in the presence of sodium silicate, and in the presence of the reaction product of an alcohol including butyl alcohol, an aromatic amino compound and phosphorus pentasulfid.

11. The process of concentrating oxidized ores by froth flotation which comprises subjecting the ore in the form of a pulp to a flotation operation in the presence of a soluble silicate and the reaction product of an alcohol, alpha naphthylamine and phosphorus pentasulfid.

12. The process of concentrating ores by froth flotation which comprises subjecting the ore in the form of a pulp to a flotation operation in the presence of a soluble silicate and, in the presence of successive stage additions of the reaction product of an alcohol in part at least butyl alcohol, an amino compound and phosphorus pentasulfid.

13. The process of claim 9 in which the alcohol is at least partly butyl alcohol, the alcohol and the amino compound are mixed before the phosphorus pentasulfid is added and the reaction product is agitated for a number of hours after the pentasulfid is added and while being agitated is held at a low temperature, substantially as described.

14. The process of concentrating ores by froth flotation which comprises subjecting the ore in the form of a pulp to a flotation operation in the presence of the reaction product of an alcohol, an amino compound and phosphorus pentasulfid, the reagent being added in successive stages in the presence of a soluble silicate.

GEORGE H. WIGTON.